Nov. 27, 1956  B. E. TUDOR  2,771,768
TORSIONALLY RESILIENT ANNULAR FASTENING MEMBER
Filed Sept. 6, 1955

INVENTOR.
BERT E. TUDOR
BY
ATTORNEY

United States Patent Office 2,771,768
Patented Nov. 27, 1956

2,771,768
TORSIONALLY RESILIENT ANNULAR FASTENING MEMBER

Bert E. Tudor, San Mateo, Calif.

Application September 6, 1955, Serial No. 532,629

2 Claims. (Cl. 70—457)

This invention relates to fastening members, and particularly to ring-like fastening members of the type adapted to secure a plurality of keys together, and more particularly to improvements in annular fastening members of the torsionally resilient type.

The subject invention is of the type broadly and generally set forth in U. S. Patent 76,941 relating to bag fasteners of the torsionally resilient type.

It is a primary object of the present invention to adapt such fasteners as are referred to in the mentioned patent for use as key rings, which key rings are so contrived as to enable their use quickly and efficiently by any possessor thereof who would otherwise be able to manipulate them only with considerable difficulty.

In the mentioned patent, a torsionally resilient semi-ring provided at the ends thereof with complemental fastener means was so arranged, with respect to said complemental fastener means, that upon an axial twisting of one end of said semi-ring relative to the other end thereof the complemental fastener means, consisting of members having, respectively, straight-edge and slot elements, could be secured together, with the reverse reaction of said semi-ring member against applied torsional forces being such that upon complemental joining of said straight-edge and slot elements the straight-edge and slot elements would be disposed out of releasing phase with each other, and, hence, in locking relation.

However, in the aforementioned patent the ring-attached complemental fastener elements were each provided with bulky protuberances, the concept being that such protuberances would enable the user to obtain an index finger and thumb purchase on each of said elements, with such purchase enabling sufficient torsional leverage to be brought to bear on said semi-ring to twist it to a locking position and to reversely twist the ring to an unlocking position. These torque applicators, or protuberances, were projectingly disposed on the outside of the ring member, thus allowing the inner side of said ring member to remain undisturbed so that it might be made to smoothly embrace the constricted throat of a bag and thereby fasten the same.

Such fasteners are not adapted for use as key rings of the torsionally resilient type, primarily because the diameters of the ring-threading apertures of keys have been fairly well standardized at approximately one-quarter of an inch, thus requiring that the torsion ring fastener elements be of substantially no greater diameter than that of the torsion ring itself. The required diametral dimensions of the ring-fastening elements are thus such as to necessitate the complemental fastening means of said elements to be formed internally of the elements, or out of view of the user. Such an arrangement offers certain problems to the user in manipulating the key ring to lock and unlock the same, as the degree of angular torsion required is not apparent to the user, with the result that the key ring is only with some difficulty opened and closed.

The subject key ring constitutes a step forward over the bag fastener of the mentioned patent in that: I have appreciated that it is not necessary, in order to lock and unlock such fastener members, to provide terminal members for the ring so sized as to enable them to be manually gripped for the purpose of twisting one of them with respect to the other; and at the same time I have appreciated that it is desirable if such terminal members are to be formed without projections, thus enabling them to be readily threaded through the threading apertures of keys, to provide such member with indicia which clearly indicates when said members are torsionally positioned for axial separation or for axial engagement.

Such other objects and advantages as are inherent in the subject invention will be apparent from the following description taken in conjunction with the drawing forming part of this specification, and in which.

Figure 6:
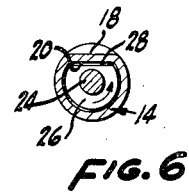
Figure 6 is a view similar to that of Figure 3, but showing the fastener means in a position in accordance with that of Figure 4.

With reference to the drawing, the key ring comprises a torsionally resilient steel cable 10, preferably multi-strand in form, which, in turn, is preferably sheathed in a tough, flexible tube 12 of thermoplastic material. Attached to the respective ends of the cable 10, as by swaging, are annular fastener elements 14 and 16, preferably of a relatively readily deformable metal, such as brass. Fastener element 14 is provided with an external indentation 18 forming on the inside surface thereof a flattened rib-like shoulder, or locking lug, 20. Fastener element 16 is provided with a reduced diametral portion 22 which, in turn, has formed integral therewith a further reduced diametral portion 24, the latter terminating in a semi-round locking head portion 26. Locking head portion 26 is truncated at one side to provide a flat edge 28 adapting said head portion 26 to be complemental in form to the cross sectional shape of fastener element 14 in the region of locking lug 20, and adapting said head portion, when disposed in a particular rotational attitude, as shown in Figure 6, to be introduced within said element 14 and extended therein past said locking lug 20. Portion 24 of element 16 is of a sufficiently reduced cross section to be adapted in any rotational attitude to clear locking lug 20.

Figure 2:
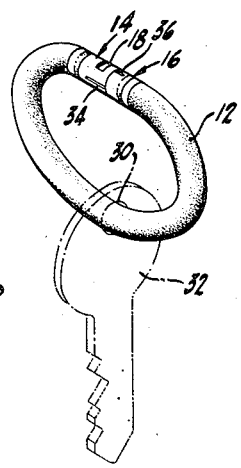
Figure 2 is a view in perspective of the key ring of Figure 1, showing, in dotted outline, a key attached thereto.

The outside diameters of both the cable-reinforced plastic tube 12 and fastener elements 14 and 16 are such as to be accommodated within the ring hole 30 of a key 32, as shown in Figure 2, said ring holes of the average keys being fairly well standardized as to size and having a minimum size of approximately one quarter of an inch.

Formed on the external surfaces of fastener elements 14 and 16 in parallel and normally offset relation with each other, as shown in Figure 2, are linear indicia 34 and 36, preferably in the form of permanently discernible score lines.

Figure 3:
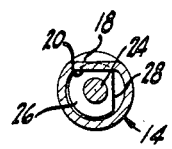
Figure 3 is a view in section taken along lines 3—3 of Figure 1, showing the fastener elements thereof in a torsionally unstressed, or locking condition.
Figure 1:
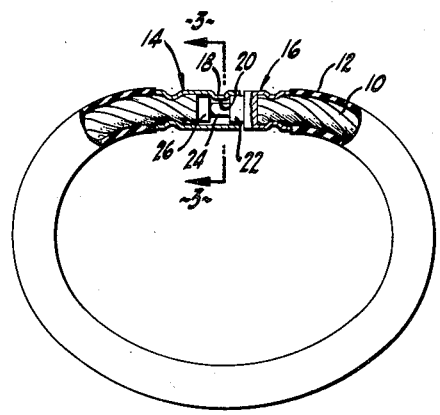
Figure 1 is a view in side elevation of a torsionally resilient key ring made in accordance with the subject invention with portions of said ring being broken away for the sake of clarity.

When the key ring is in a closed position, as indicated in Figures 1–3, score lines 34 and 36 are in offset relation and locking head portion 26 of fastener element 14 is secured within fastener 16 against withdrawal therefrom by locking lug 20. In this condition of the ring, cable 10 and plastic sheath 12 are torsionally unstressed, with the resistance of cable 10 to torsional stressing being such as to maintain lug 20 and head portion 26 in locked position even under severe conditions of use of the ring.

Figure 4:
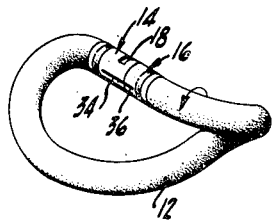
Figure 4 is a view in perspective of the key ring of Figure 2, but showing the same in a torsionally stressed condition, i. e. wherein the fastener means thereof are in an unlocking position.
Figure 5:
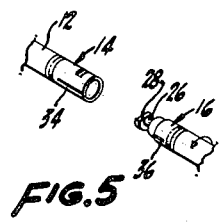
Figure 5 is a detail view in perspective of the fastener means portions of the ring, as shown in Figure 4, but illustrating said fastener means in a longitudinally separated position.

When the ring is torsionally stressed, as by, preferably, applying to the extreme lateral portions thereof opposite rotative forces by means of the thumbs and forefingers of the hands, the fastener elements 14 and 16 may be urged to the position of Figures 4 and 6, in which position the score line indicia 34 and 36 are in alignment. Then, as indicated in Figure 5, the fastener elements may be longitudinally separated to open the key ring. In reverse fashion, the ring may be closed by rotating one of the fastener elements relatively to the other to bring score line indicia 34 and 36 into alignment, followed by the insertion of element 16 into element 14 and the releasing of the cable to allow it to return to its normal, or torsionally unstressed, condition.

The plastic sheath serves the dual purpose of cushioning the user's fingers against the steel cable 10 and also serving as a carrier for printed notations in the form of advertising and the like. The plastic sheath is sufficiently tough to maintain its original positional attitude on the cable, with the strand twists of the cable serving, in effect, as corrugations frictionally engaging the inside surface of the sheath.

From the foregoing, it will be appreciated that the key ring described enables the attainment of the objects and the advantages above set forth.

What is claimed is:

1. A fastener device comprising a multi-strand braided steel cable, complemental attachment members fitted over the ends of said cable and fixedly secured thereto, one of said members having a hollow end provided with an inwardly directed locking shoulder, the other of said members having an end portion terminating in an enlarged semi-cylindrical head, said head being adapted to be inserted within said hollow end past said locking shoulder when one end of said cable is rotatably twisted to a predetermined degree with respect to the other end of said cable, said head being adapted to be retained within said hollow end by said shoulder when the twisted end of said cable is allowed to return to an untwisted condition, a pair of marking indicia formed on the external surfaces of said attachment members, said indicia being offset with respect to each other to said predetermined degree when said attachment members are secured together and said cable is in an untwisted condition, and said indicia being in alignment with each other when one end of said cable is twisted to rotate said head to a position of release with respect to said locking shoulder, and a thin-walled, tough, flexible plastic covering enclosing said cable and secured against movement with respect to said cable, when said cable is twisted and untwisted, by means comprising corrugations defined by the braided strands of said cable.

2. A fastener device, as set forth in claim 1, the exposed portions of said attachment members, when they are secured together, being substantialy cylindrical in form, being the same in diameter, and having a diametral dimension only slightly in excess of the diameter of said cable, whereby said attachment members, when separated from each other, may be readily passed through circular apertures formed in objects to be secured together by said device.

References Cited in the file of this patent

UNITED STATES PATENTS

| | | |
|---|---|---|
| 195,400 | Richard | Sept. 18, 1877 |
| 279,267 | Nock | June 12, 1883 |
| 376,453 | Scott | Jan. 17, 1888 |

FOREIGN PATENTS

| | | |
|---|---|---|
| 248,593 | Germany | June 25, 1912 |